(12) United States Patent
Teshigawara

(10) Patent No.: US 10,484,516 B2
(45) Date of Patent: Nov. 19, 2019

(54) FILTERING APPARATUS, METHOD, AND RECORDING MEDIUM

(71) Applicant: NEC CORPORATION, Tokyo (JP)

(72) Inventor: Masaaki Teshigawara, Tokyo (JP)

(73) Assignee: NEC Corporation, Tokyo (JP)

( * ) Notice: Subject to any disclaimer, the term of this patent is extended or adjusted under 35 U.S.C. 154(b) by 63 days.

(21) Appl. No.: 15/537,289

(22) PCT Filed: Dec. 14, 2015

(86) PCT No.: PCT/JP2015/006228
§ 371 (c)(1),
(2) Date: Jun. 16, 2017

(87) PCT Pub. No.: WO2016/098342
PCT Pub. Date: Jun. 23, 2016

(65) Prior Publication Data
US 2017/0353587 A1    Dec. 7, 2017

(30) Foreign Application Priority Data
Dec. 19, 2014    (JP) .................................. 2014-257131

(51) Int. Cl.
*H04L 29/06*    (2006.01)
*H04L 12/741*    (2013.01)

(52) U.S. Cl.
CPC .............. *H04L 69/22* (2013.01); *H04L 45/74* (2013.01); *H04L 45/745* (2013.01); *H04L 69/166* (2013.01)

(58) Field of Classification Search
None
See application file for complete search history.

(56) References Cited

U.S. PATENT DOCUMENTS

| 7,298,746 B1* | 11/2007 | De La Iglesia | H04L 47/10 370/394 |
| 2004/0267945 A1* | 12/2004 | Reiss | H04L 29/06 709/229 |

(Continued)

FOREIGN PATENT DOCUMENTS

| JP | 2005-080246 | 3/2005 |
| JP | 2005-101690 | 4/2005 |

(Continued)

OTHER PUBLICATIONS

International Search Report, PCT/JP2015/006228, dated Mar. 1, 2016.

*Primary Examiner* — Michael J Moore, Jr.
(74) *Attorney, Agent, or Firm* — Young & Thompson

(57) ABSTRACT

The present invention enables packet data to be filtered without distinguishing between non-fragmented packets and fragmented packets. This invention is characterized in that: when received packet data is a fragmented packet but is not a lead fragmented packet, header information of the lead fragmented packet, which has the same fragmented packet identification information as that of the packet data, is given to the packet data as a pseudo-header; the header information of the packet data is used as a key and a filter table is searched in which a filter condition about the header information corresponds to a process implemented when the filter condition is satisfied; the process corresponding to the filter condition satisfied by the header information of the packet data is determined as a process performed for the packet data; and the determined process is performed on the packet data.

20 Claims, 12 Drawing Sheets

(56) References Cited

U.S. PATENT DOCUMENTS

| | | | | |
|---|---|---|---|---|
| 2005/0286517 A1* | 12/2005 | Babbar | ............... | H04L 45/00 |
| | | | | 370/389 |
| 2009/0171890 A1* | 7/2009 | Johnson | ............ | G06F 17/30516 |
| 2013/0242997 A1 | 9/2013 | Bansod et al. | | |
| 2014/0064280 A1* | 3/2014 | Qin | ............... | H04B 7/18582 |
| | | | | 370/392 |
| 2017/0257647 A1* | 9/2017 | Iguchi | ............... | H04N 21/231 |

FOREIGN PATENT DOCUMENTS

| | | |
|---|---|---|
| JP | 2007-124117 | 5/2007 |
| JP | 2009-239685 | 10/2009 |
| JP | 2011-066903 | 3/2011 |

\* cited by examiner

Fig. 8

| VERSION (4bits) | HEADER LENGTH (4bits) | SERVICE TYPE (ToS) (8bits) | TOTAL LENGTH (16bits) | |
|---|---|---|---|---|
| IDENTIFIER (16bits) | | | FLAG (3bits) | FRAGMENT OFFSET (13bits) |
| TIME TO LIVE (TTL) (8bits) | | PROTOCOL (8bits) | HEADER CHECKSUM (16bits) | |
| TRANSMISSION SOURCE IP ADDRESS (32bits) | | | | |
| DESTINATION IP ADDRESS (32bits) | | | | |
| OPTION | | | | PADDING |
| DATA | | | | |

FILTERING APPARATUS, METHOD, AND RECORDING MEDIUM

TECHNICAL FIELD

The present invention relates to an apparatus, a method, and a recording medium for filtering fragmented packet data.

BACKGROUND ART

When a node receives an IP (Internet Protocol) packet, the node is required to appropriately perform a process of passing and transferring the received IP packet to a destination, or discarding the received IP packet. A function of determining what process is to be performed with respect to a received IP packet as described above is referred to as filtering.

In implementing filtering, a node registers in advance filter criteria (rules) and processes (services) associated with the filter criteria in a filter table in the priority order. Further, when receiving an IP packet, the node searches, in the priority order, whether or not a filter criterion to be satisfied by information included in the IP packet exists in the filter table. When a filter criterion to be satisfied by information included in a received IP packet is found, the node determines a process associated with the filter criterion as a process to be performed with respect to the IP packet. Further, the node performs a process of transferring an IP packet to an appropriate destination node, or discarding the IP packet according to a determined process content.

As filter criteria, it is possible to use various header information in a TCP/IP (Transmission Control Protocol/Internet Protocol) protocol stack. For instance, it is possible to use header information of a network layer (such as an IP), header information of a transport layer (such as a TCP or a UDP (User Datagram Protocol)), header information of an application layer, or the like. FIG. 8 illustrates an IP header, and FIG. 9 illustrates a UDP header.

In this example, there is described a filtering example, in which five information pieces (an IP 5-tuple) i.e. an IP header of a network layer (a transmission source IP address, a destination IP address, and a protocol) and a UDP header of a transport layer (a transmission source port number and a destination port number) are set as a filter criterion.

In a host or a router, when the IP packet length is longer than the length of an MTU (Maximum Transmission Unit) within a network, and when a non-dividable flag indicated in a flag field within an IP header is set to be dividable, a packet is divided for transmission. The packet dividing process is referred to as fragmentation.

FIG. 10 illustrates an example of a packet when UDP data is fragmented. As illustrated in the example of FIG. 10, when an IP packet is divided, an original IP header is attached to all the IP packets. However, header information of a transport layer or a layer higher than the transport layer such as a UDP header is included in IP data of an IP packet. In view of the above, the header information is included only in a divided leading IP packet.

When filtering is performed by using an IP 5-tuple as a filter criterion, it is possible to specify a transmission source IP address, a destination IP address, and a protocol with respect to all the divided IP packets, because the transmission source IP address, the destination IP address, and the protocol are included in an IP header. However, a transmission source port number and a destination port number are specified only by a divided leading IP packet, because the transmission source port number and the destination port number are included in a UDP header.

Thus, it is possible to determine a process (a service) by accurately filtering a leading IP packet when a divided IP packet is filtered with use of an IP 5-tuple as a filter criterion. However, it is not possible to accurately specify a transmission source port number and a destination port number by an IP packet other than a leading IP packet, and as a result of filtering, an unintended service may be applied, or an IP packet may be discarded.

In the following description, a divided (fragmented) IP packet is referred to as a fragment packet, a divided leading IP packet is referred to as a leading fragment packet, and a non-divided IP packet is referred to as a non-fragment packet.

PTL 1 discloses an example of a fragment packet filtering method as described above. In this method, a filtering result of a leading fragment packet is registered in a routing table, and when second and succeeding fragment packets are received, a process is performed based on the filtering result registered in the routing table.

CITATION LIST

Patent Literature

[PTL 1] Japanese Laid-open Patent Publication No. 2011-66903

SUMMARY OF INVENTION

Technical Problem

However, in the method described in PTL 1, a routing table entry is generated for each fragment packet group with respect to a fragment packet, and a different filtering process is performed between a fragment packet and a non-fragment packet. This may make a filtering function cumbersome.

Further, performing a different filtering process between a non-fragment packet and a fragment packet requires addition or modification with respect to each filtering process, when another function is added to a filtering function, or a filtering function is modified. This may increase the amount of modification. In other words, performing a different filtering process between a non-fragment packet and a fragment packet may lower extensibility.

In other words, as far as filtering is possible without distinguishing a non-fragment packet and a fragment packet, it is possible to avoid cumbersomeness in a filtering process. Further, when another function is added to a filtering function, or a filtering function is modified, it is possible to perform addition or modification without distinguishing a non-fragment packet and a fragment packet. In other words, it is possible to maintain extensibility.

An object of the present invention is to provide a filtering apparatus, a filtering method, and a recording medium which enable to perform filtering of packet data without distinguishing a non-fragment packet and a fragment packet.

Solution to Problem

For settling the above-mentioned problem, a filtering apparatus according to an exemplary aspect of the invention comprises: a receiving means for receiving packet data, a pseudo header attaching means for attaching header information of a leading fragment packet having same fragment packet identification information as the packet data to the packet data as a pseudo header when the received packet data is a fragment packet, and is not a leading fragment packet, a filtering means for searching a filter table, in which a filter criterion relating to the header information, and a process to be performed when the filter criterion is satisfied are associated with each other by using the header information of the packet data as a key, and determining the process associated with the filter criterion to be satisfied by the header information of the packet data, as a process to be performed with respect to the packet data, and a processing means for deleting the pseudo header attached by the pseudo header attaching means from the packet data, and performing the process determined by the filtering means with respect to the packet data.

And, a filtering method according to an exemplary aspect of the invention comprises: receiving packet data, attaching header information of a leading fragment packet having same fragment packet identification information as the packet data to the packet data as a pseudo header when the packet data is a fragment packet, and is not a leading fragment packet, searching a filter table in which a filter criterion relating to the header information, and a process to be performed when the filer criterion is satisfied are associated with each other by using the header information of the packet data as a key, and determining the process associated with the filter criterion to be satisfied by the header information of the packet data as a process to be performed with respect to the packet data, and deleting the attached pseudo header from the packet data, and performing the determined process with respect to the packet data.

And a computer readable recording medium recorded with a filtering program according to an exemplary aspect of the invention which causes a computer to implement: a receiving function of receiving packet data, a pseudo header attaching function of attaching header information of a leading fragment packet having same fragment packet identification information as the packet data to the packet data as a pseudo header when the packet data is a fragment packet, and is not a leading fragment packet, a filtering function of searching a filter table in which a filter criterion relating to the header information, and a process to be performed when the filer criterion is satisfied are associated with each other by using the header information of the packet data as a key, and determining the process associated with the filter criterion to be satisfied by the header information of the packet data as a process to be performed with respect to the packet data, and a processing function of deleting the pseudo header attached by the pseudo header attaching function from the packet data, and performing the process determined by the filtering function with respect to the packet data.

Advantageous Effects of Invention

A filtering apparatus, a filtering method, and a recording medium of the present invention are advantageous in performing filtering of packet data without distinguishing a non-fragment packet and a fragment packet.

BRIEF DESCRIPTION OF DRAWINGS

FIG. 8 shows a diagram illustrating an IP header;

DESCRIPTION OF EMBODIMENTS

First Example Embodiment

The first example embodiment of the present invention is described using a specific example.

Figure 1:
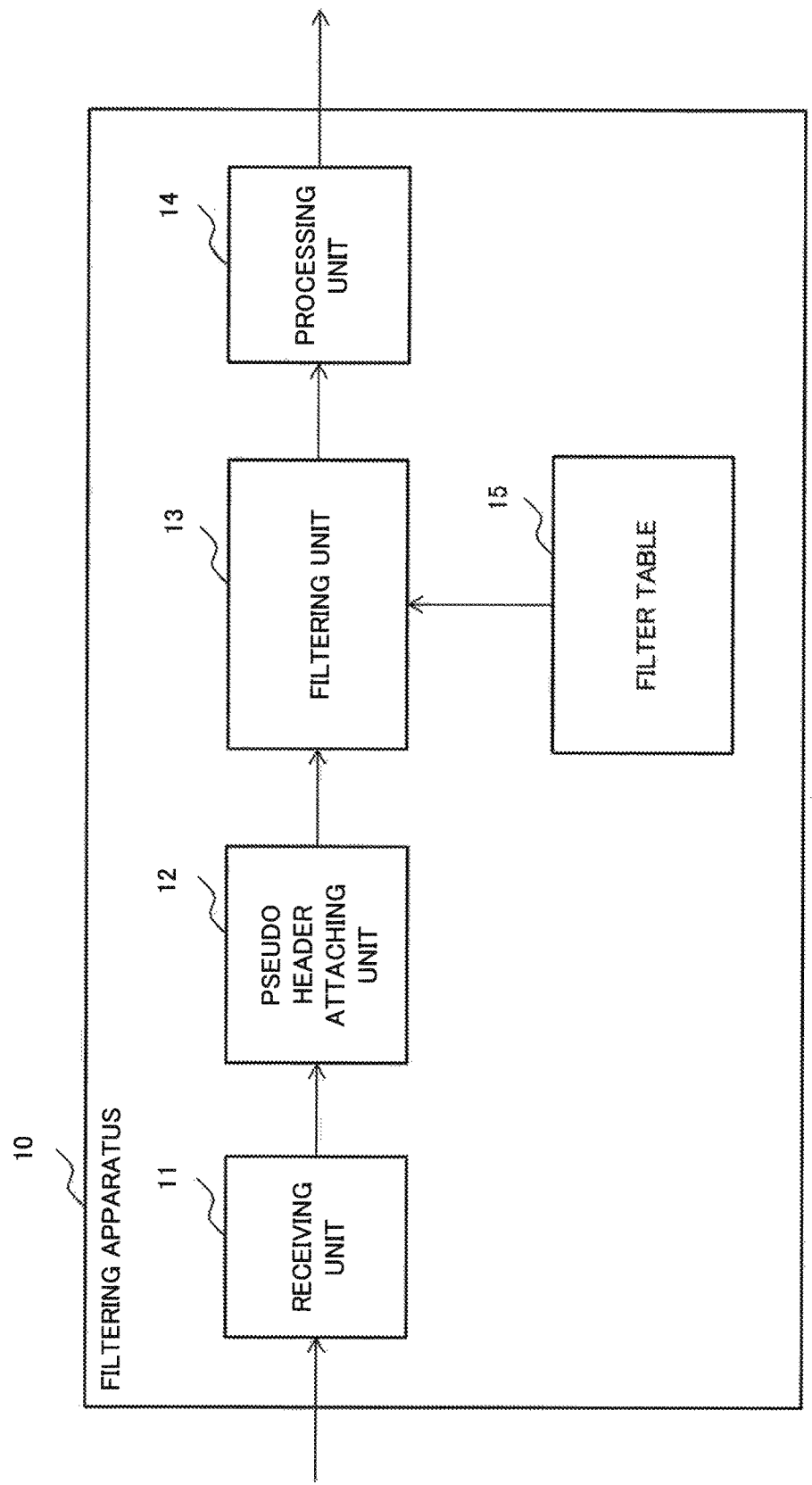
FIG. 1 shows a diagram illustrating a configuration example of a filtering apparatus in a first example embodiment of the present invention.

First of all, FIG. 1 illustrates a configuration example of a filtering apparatus in the example embodiment. A filtering apparatus 10 is constituted by a receiving unit 11, a pseudo header attaching unit 12, a filtering unit 13, a processing unit 14, and a filter table 15. The filtering apparatus corresponds to each node in a network.

Note that directions of arrows in FIG. 1 indicate an example, and do not limit directions of signals between blocks. Further, the same definition as described above is also applied to the other drawings.

The receiving unit 11 is a unit configured to receive packet data.

The pseudo header attaching unit 12 is a unit configured to attach header information necessary for filtering by the filtering unit 13 in a subsequent stage, as a pseudo header when packet data received by the receiving unit 11 is a fragment packet, and is not a leading fragment packet.

The filtering unit 13 is a unit configured to perform filtering based on header information and the filter table 15 with respect to packet data input from the pseudo header attaching unit 12, and configured to determine a process to be performed.

The processing unit 14 is a unit configured to delete a pseudo header attached by the pseudo header attaching unit 12 from packet data, which is input from the filtering unit 13, and configured to perform a process determined by the filtering unit 13 with respect to the packet data.

Configuring the filtering apparatus of the example embodiment as described above makes it possible to attach a pseudo packet to a fragment packet. Thus, it is possible to perform filtering of packet data without distinguishing a non-fragment packet and a fragment packet.

Figure 2:
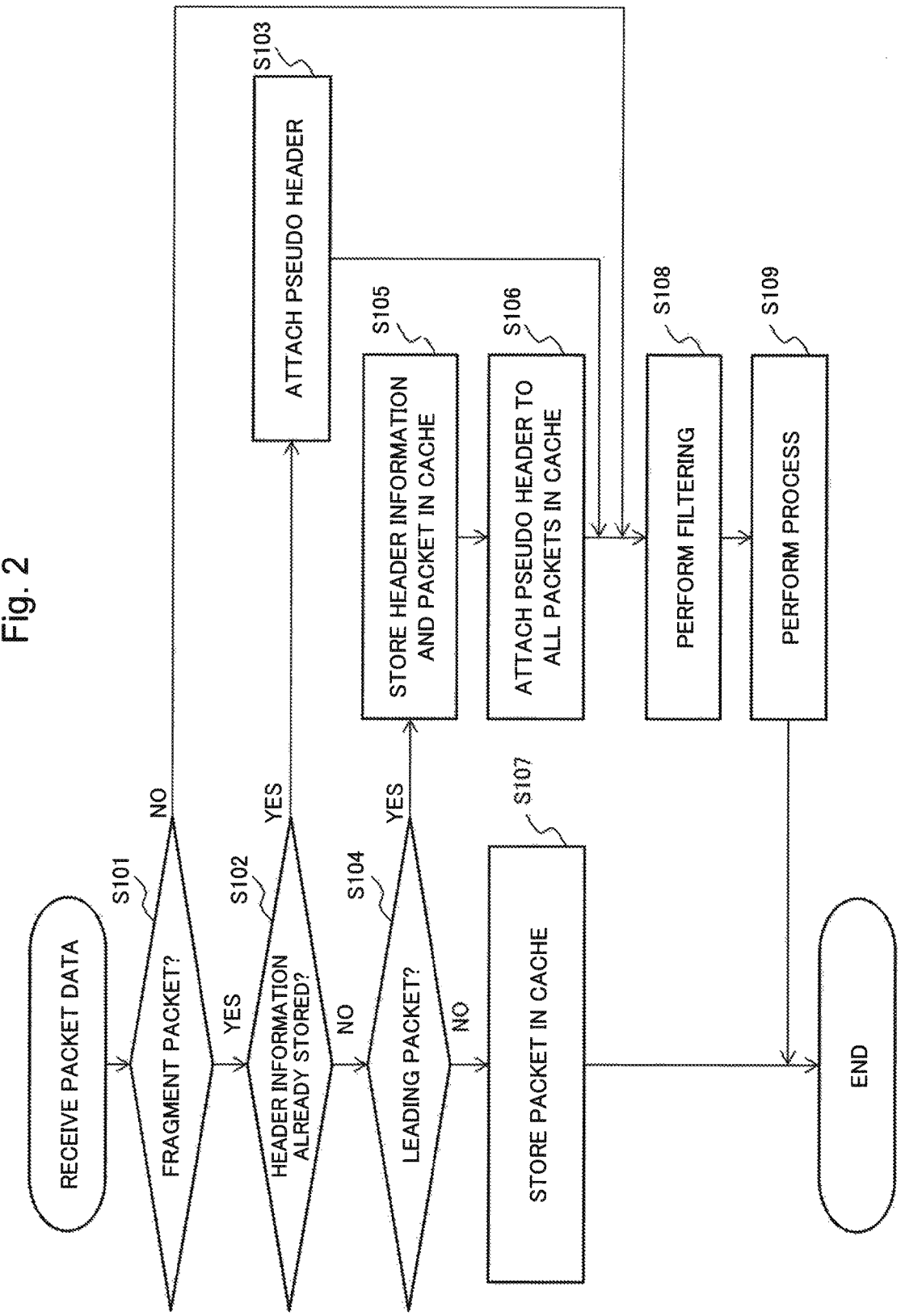
FIG. 2 shows a diagram illustrating an operation example of the filtering apparatus in the first example embodiment of the present invention.

Next, an operation example of the filtering apparatus in the example embodiment is described using FIG. 2.

When the receiving unit 11 receives packet data, the pseudo header attaching unit 12 determines whether or not the received packet data is a fragment packet (Step S101). When the received packet data is not a fragment packet, the pseudo header attaching unit 12 transmits the packet data to the filtering unit 13.

When the received packet data is a fragment packet, the pseudo header attaching unit 12 confirms whether or not header information relating to the fragment packet is stored in a cache of the pseudo header attaching unit 12 (Step S102).

Figure 3:
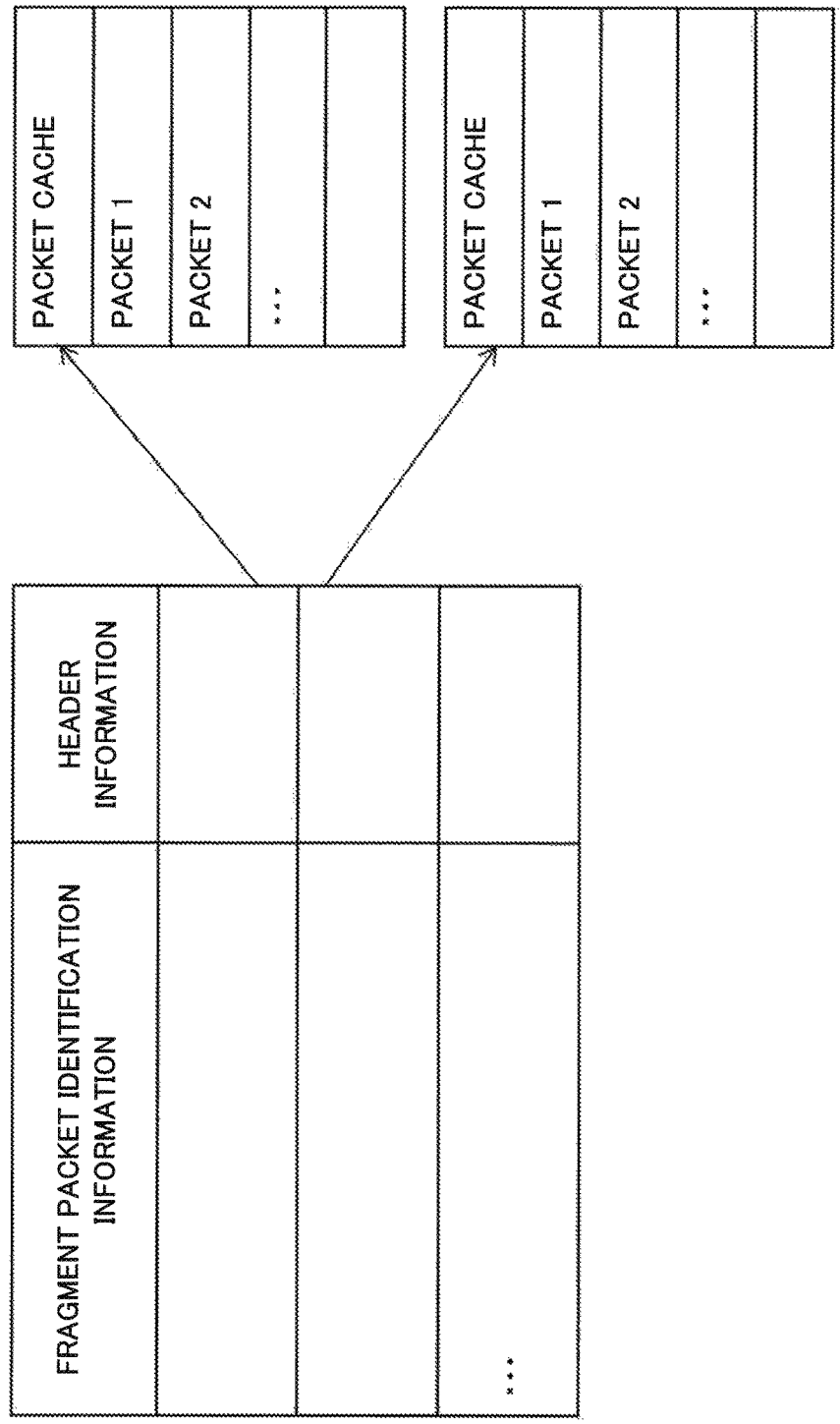
FIG. 3 shows a diagram illustrating an example of a cache in the first example embodiment of the present invention.

As illustrated in FIG. 3, a cache in the pseudo header attaching unit 12 stores header information in terms of a fragment packet identification information unit. Fragment packet identification information is information for identifying a fragment packet obtained by dividing a same packet. For instance, it is possible to use a value of an identifier field in an IP header as fragment packet identification information. Further, it is possible to combine a transmission source IP address or a destination address in addition to an identifier as fragment packet identification information.

When header information associated with fragment packet identification information of received packet data is stored in a cache, the pseudo header attaching unit 12 attaches the header information to the packet data as pseudo header information, and transmits the packet data to the filtering unit 13 (Step S103).

When header information associated with fragment packet identification information of received packet data is not stored in a cache, the pseudo header attaching unit 12 confirms whether or not the packet data is a leading fragment packet (Step S104). When the packet data is a leading fragment packet, the pseudo header attaching unit 12 stores the header information extracted from the packet data and the packet data in a cache (Step S105).

For instance, as illustrated in FIG. 3, regarding a header information storage area and a packet cache area secured in terms of a fragment packet identification information unit, the pseudo header attaching unit 12 stores header information extracted from packet data in the header information storage area, and stores the packet data in the packet cache area. When the pseudo header attaching unit 12 does not receive packet data having the same fragment packet identification information as the received packet data before, the pseudo header attaching unit 12 newly secures these areas, because these areas are not secured, and stores the header information and the packet data. When these areas are already secured, a packet having the same fragment packet identification information as received before a leading fragment packet is received is stored in a packet cache area.

Note that a temporary storage area secured as a cache as described above increases when the secured temporary storage area is held as it is. Therefore, it is desirable to release the temporary storage area at a certain point of time in terms of a fragment packet identification information unit. For instance, it is proposed that an area relating to fragment packet identification information of packet data is released at a point of time after lapse of a predetermined time period, when an MF (More Fragments) bit in a flag field within an IP header indicates that there is no succeeding fragment packet. Further, it is also proposed that packet data having associated fragment packet identification information is released at a point of time after lapse of a predetermined time period from a time when the packet data is received most recently.

After Step S105, the pseudo header attaching unit 12 extracts all the packet data stored in a packet cache area, attaches stored header information to the packet data as a pseudo header, and transmits the packet data to the filtering unit 13 (Step S106). By performing this step, a pseudo header is attached to a packet having the same fragment packet identification information as received before a leading fragment packet is received.

In Step S104, when packet data is not a leading fragment packet, the pseudo header attaching unit 12 stores the packet data in a cache (Step S107). For instance, as illustrated in FIG. 3, the pseudo header attaching unit 12 stores received packet data in a packet cache area secured in terms of a fragment packet identification information unit. When a header information area and a packet cache area with respect to associated fragment packet identification information are not secured, the pseudo header attaching unit 12 newly secures these areas.

Further, the filtering unit 13 determines a process to be performed by the processing unit 14 by performing filtering of each packet data transmitted from the pseudo header attaching unit 12 based on header information and the filter table 15, and transmits the determined process to the processing unit 14 (Step S108). In performing filtering, first of all, the filtering unit 13 searches whether or not a filter criterion (a rule) to be satisfied by header information of packet data exists in the filter table 15 in the priority order. When a filter criterion to be satisfied by header information of packet data exists, the filtering unit 13 determines a process associated with the filter criterion as a process to be performed with respect to the packet data. Further, the processing unit 14 deletes a pseudo header attached by the pseudo header unit 12 from each packet data, and performs a process determined by the filtering unit with respect to each packet data (Step S109).

Figure 4:
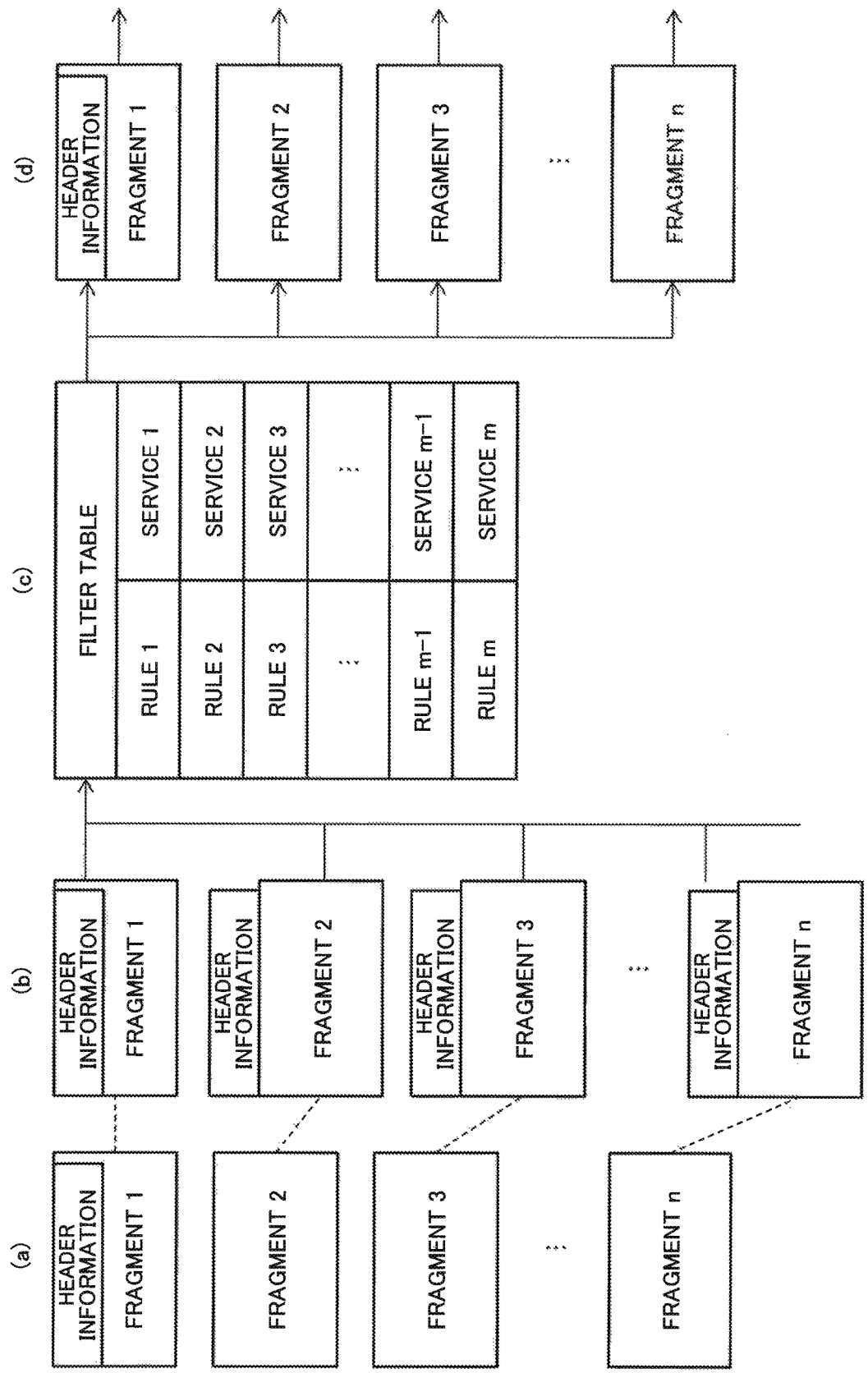
FIG. 4 shows a diagram illustrating an example of a flow of packet data in the first example embodiment of the present invention.

Next, an example of a flow of packet data in the filtering apparatus of the example embodiment is described using FIG. 4.

Figure 10:
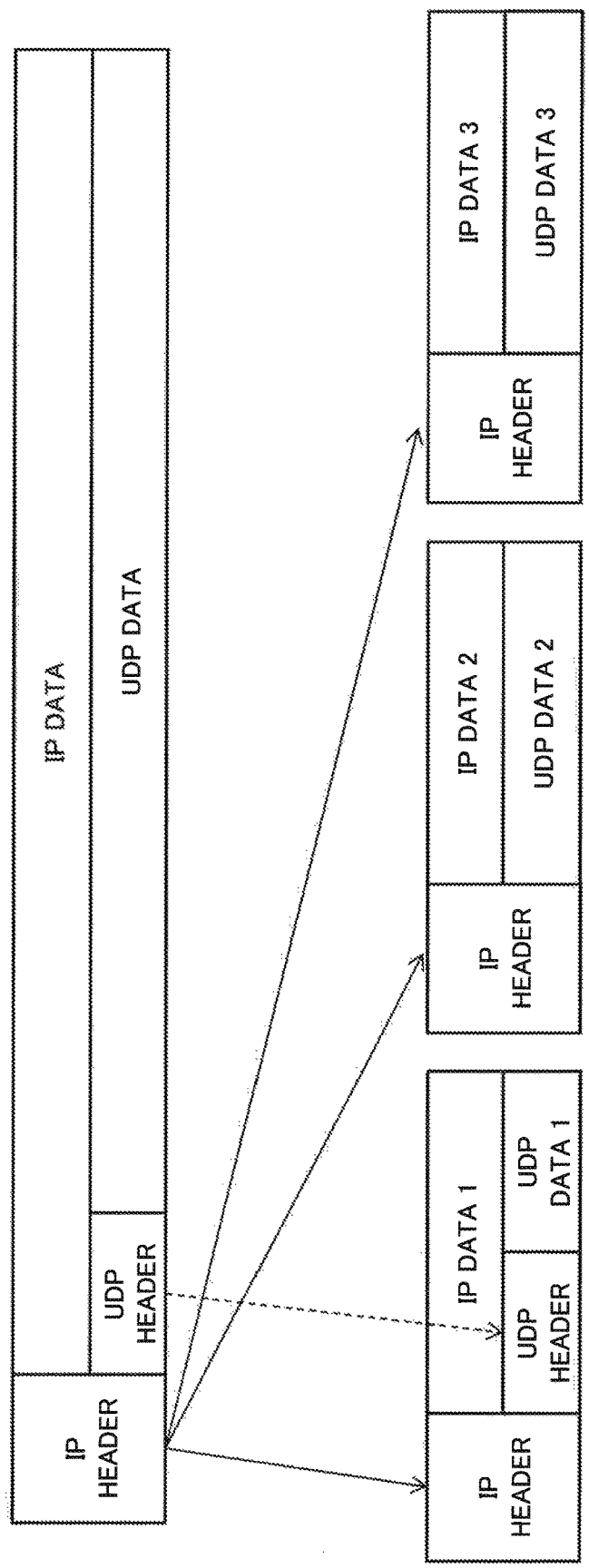
FIG. 10 shows a diagram illustrating an example of fragmentation of UDP data.

FIG. 4(a) illustrates an example of a received packet data row. Header information exists only in packet data of a leading fragment 1, and header information does not exist in the other fragments i.e. in a fragment 2 to a fragment n. For instance, header information corresponds to a UDP header illustrated in FIG. 10. Although illustration of an IP header is omitted in FIG. 4, an IP header is attached to each packet. Note that in this example, there is described a case where a protocol of a transport layer is UDP, as an example. The example embodiment, however, is also applicable to a case where another protocol is used.

FIG. 4(b) illustrates a result obtained by performing the operations of Steps S101 to S107 illustrated in FIG. 2 with respect to the packet data row illustrated in FIG. 4(a). Pseudo header information is attached to packet data in the fragment 2 to the fragment n. Header information of a leading fragment packet is used as a pseudo header to be attached in this example. For instance, when filtering is performed with use of an IP 5-tuple as described above, a UDP header included in a leading fragment packet is attached as a pseudo header, because insufficient information is a transmission source port number and a destination port number of the UDP header. It is not necessary to newly attach a transmission source IP address, a destination IP address, and a protocol out of an IP 5-tuple, because these information pieces are included in an IP header, whose illustration is omitted in FIG. 4.

Each packet data (FIG. 4(b)) having a pseudo header attached thereto is filtered based on each header information (e.g. an IP 5-tuple) and the filter table illustrated in FIG. 4(c). In performing filtering, first of all, the filtering unit 13 searches whether or not a filter criterion (a rule) to be satisfied by header information of packet data exists in a filter table in the priority order. When a filter criterion to be satisfied by header information of packet data exists, the filtering unit 13 determines a process (a service) associated with the filter criterion as a process to be performed with respect to the packet data.

Further, as illustrated in FIG. 4(*d*), a pseudo header attached in FIG. 4(*b*) is deleted, and a process according to a determined process content is performed.

As described above, in the first example embodiment of the present invention, it is possible to attach a pseudo header to a fragment packet. Therefore, it is possible to perform filtering of packet data without distinguishing a non-fragment packet and a fragment packet.

Second Example Embodiment

Next, the second example embodiment of the present invention is described.

Normally, it is possible to register, as a filter criterion (a rule) in a filter table 15, IP addresses whose IP versions are different from each other, a range of IP addresses or port numbers, a plurality of port numbers, and the like. In other words, a plurality of packet criteria whose header information of packet data coincide with each other may be registered in the filter table 15. In view of the above, it is necessary to confirm whether or not header information satisfies each filter criterion in the priority order, each time a packet is input. Further, when a filter criterion to be satisfied by header information does not exist, it is confirmed whether or not header information satisfies a filter criterion with respect to all the filter criteria. As a result, when many filter criteria are registered, it takes a lot of time to search a filter table.

In the example embodiment, taking an advantage that a same process (a same service) is applied because packet data having the same header information satisfies the same filter criterion (the same rule), it is possible to reduce the number of times of searching a filter table by registering a filtering result in a flow table.

Figure 5:
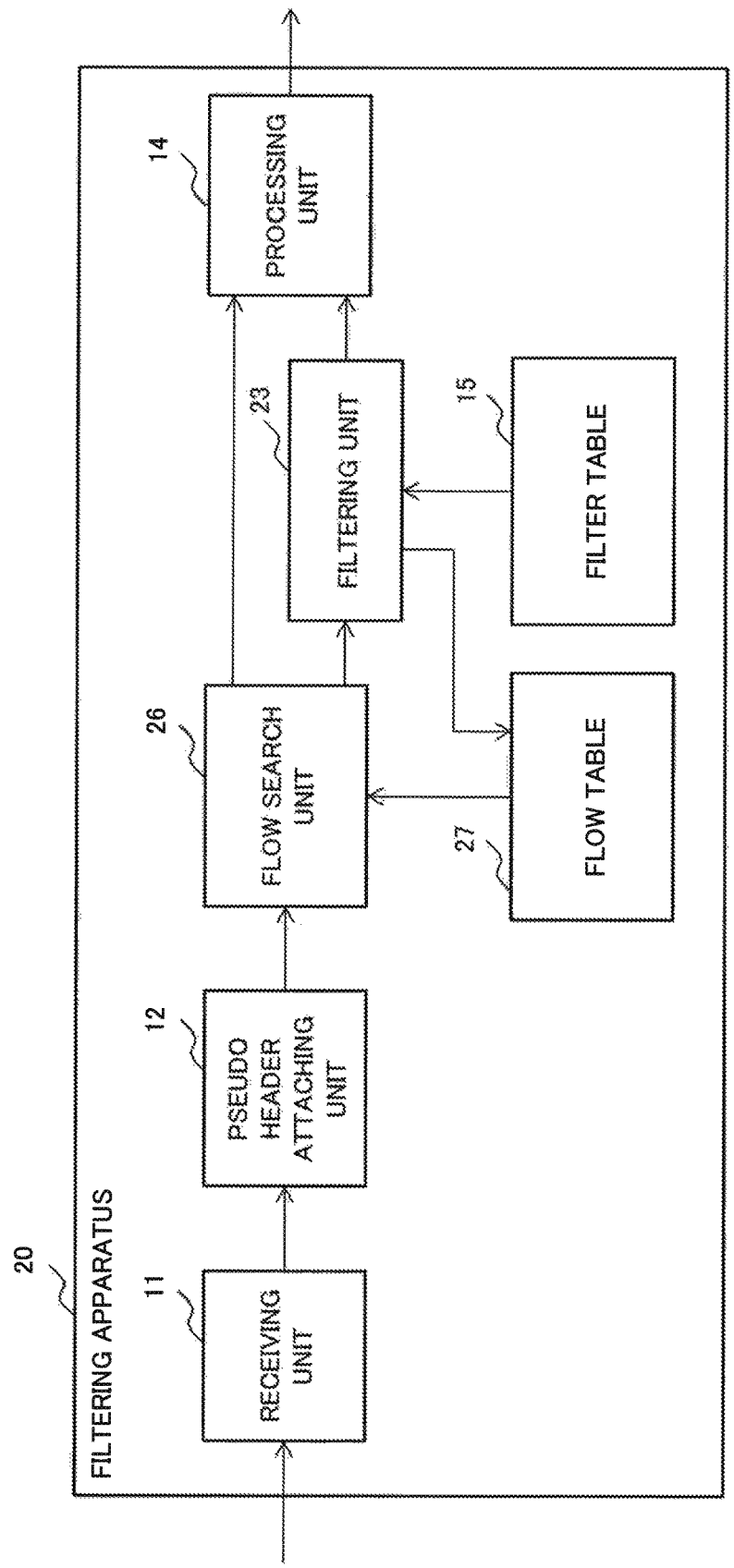
FIG. 5 shows a diagram illustrating a configuration example of a filtering apparatus in a second example embodiment of the present invention.

FIG. 5 illustrates a configuration example of a filtering apparatus 20 in the example embodiment. A flow search unit 26 and a flow table 27 are added to the configuration example (FIG. 1) of the first example embodiment. A receiving unit 11, a pseudo header attaching unit 12, a processing unit 14, and a filter table 15 are the same as those in the first example embodiment, and therefore, description thereof is omitted herein.

As well as the first example embodiment, a filtering unit 23 is a unit configured to determine a process with respect to received packet data. In the first example embodiment, filtering is performed based on header information and the filter table 15. In the second example embodiment, however, the flow table 27 is used in addition to the filter table 15.

As well as the first example embodiment, the filtering unit 23 searches the filter table 15. Further, when there exists a filter criterion to be satisfied by header information of packet data, a process (a service) associated with the header information (a flow) and the filter criterion is registered in the flow table 27.

The flow search unit 26 searches the flow table 27 before a filter table is searched by the filtering unit 23. When header information (a flow) that coincides with header information of an input packet is registered in the flow table 27, the flow search unit 26 determines that a process (a service) associated with the header information is a process to be performed with respect to packet data, and transmits the packet to the processing unit 14. When header information (a flow) that coincides with header information of input packet data does not exist in the flow table 27, the flow search unit 26 transmits the packet data to the filtering unit 23.

Configuring the filtering apparatus of the example embodiment as described above makes it possible to attach a pseudo header to a fragment packet as well as the first example embodiment. Therefore, it is possible to perform filtering of packet data without distinguishing a non-fragment packet and a fragment packet as well as the first example embodiment.

Further, in the example embodiment, a flow table is searched before a filter table is searched, which takes time. Therefore, it is possible to determine a process with respect to packet data more speedily with respect to packet data having header information, which is searched in the filter table before.

In a flow table, a process is registered in association with header information (a flow) by one-to-one correspondence. Therefore, it is possible to uniquely determine a process to be applied from header information by performing a certain arithmetic operation such as hash search, in place of searching in order. In other words, using a flow table makes it possible to determine a process with respect to packet data at a high speed, as compared with a case where a filter table in which many filter criteria are registered is searched.

Further, it is possible to register both of a fragment packet and a non-fragment packet in a flow table. Therefore, regarding both of a fragment packet and a non-fragment packet, it is possible to determine more speedily a process to be performed with respect to packet data having header information, which is searched in a filter table before.

Figure 6:
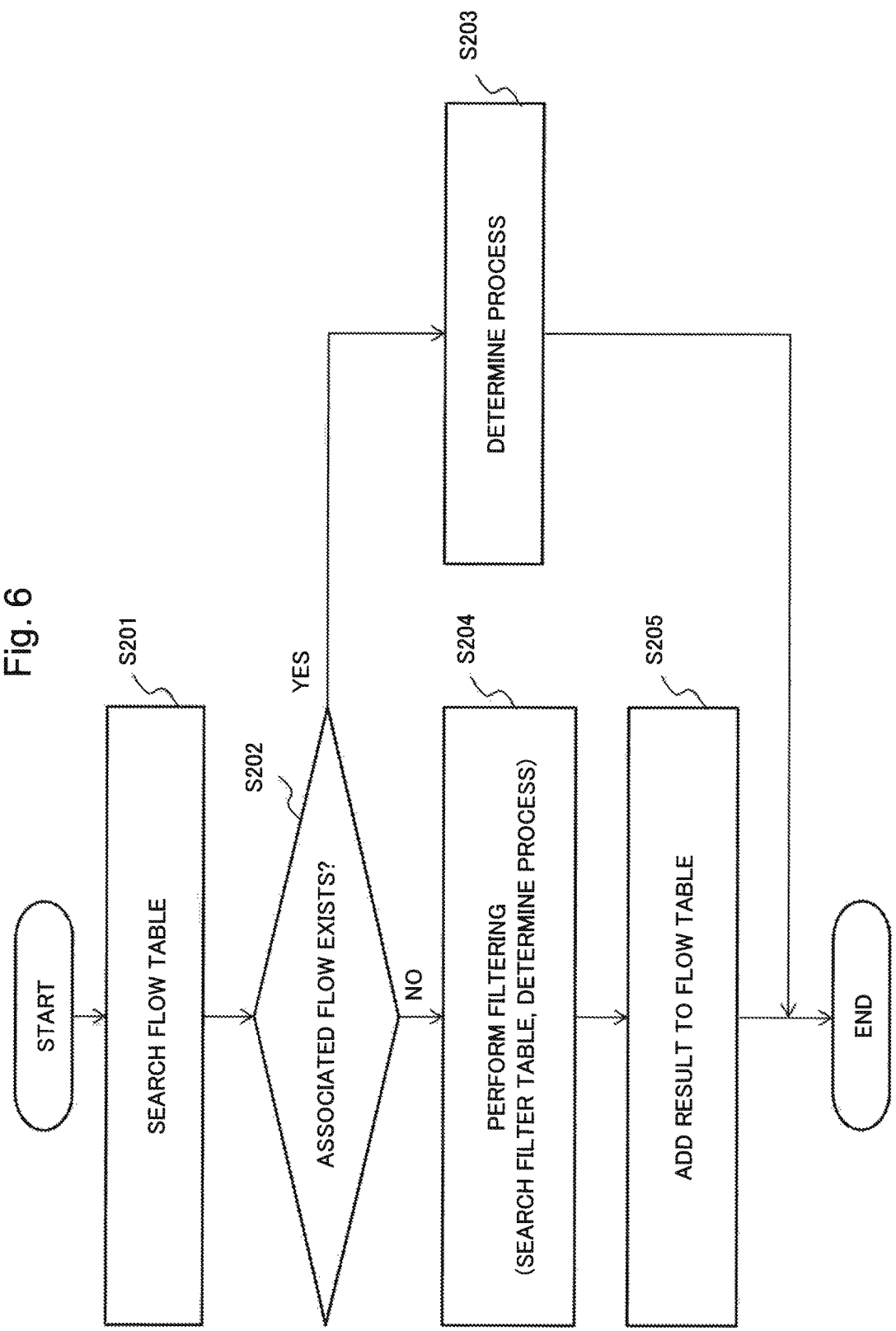
FIG. 6 shows a diagram illustrating an operation example of the filtering apparatus in the second example embodiment of the present invention.

Next, FIG. 6 illustrates an example of an operation of the flow search unit 26 and the filtering unit 23 in the example embodiment. The operation illustrated in FIG. 6 is an operation to be performed in place of Step S108 in FIG. 2.

First of all, in response to receiving packet data from the pseudo header attaching unit 12, the flow search unit 26 searches the flow table 27 by using header information of the packet data as a key (Step S201). When there exists a flow whose header information coincides with the header information of the packet data, the flow search unit 26 determines a process (a service) associated with the flow as a process to be performed with respect to the packet data, and transmits the packet data to the processing unit 14 (Steps S202 and S203).

When there does not exist a flow whose header information coincides with the header information of the packet data in the flow table 27, the filtering unit 23 determines a process to be performed with respect to the packet data by searching the filter table 15, and transmits the packet data to the processing unit 14 (Step S204). An operation (filtering) of determining a process by searching the filter table 15 is the same as the operation (Step S108 in FIG. 2) in the first example embodiment. Further, the filtering unit 23 adds, to the flow table, a filtering result, specifically, the header information of the packet data and a process determined to be performed with respect to packet data (Step S205).

Figure 7:
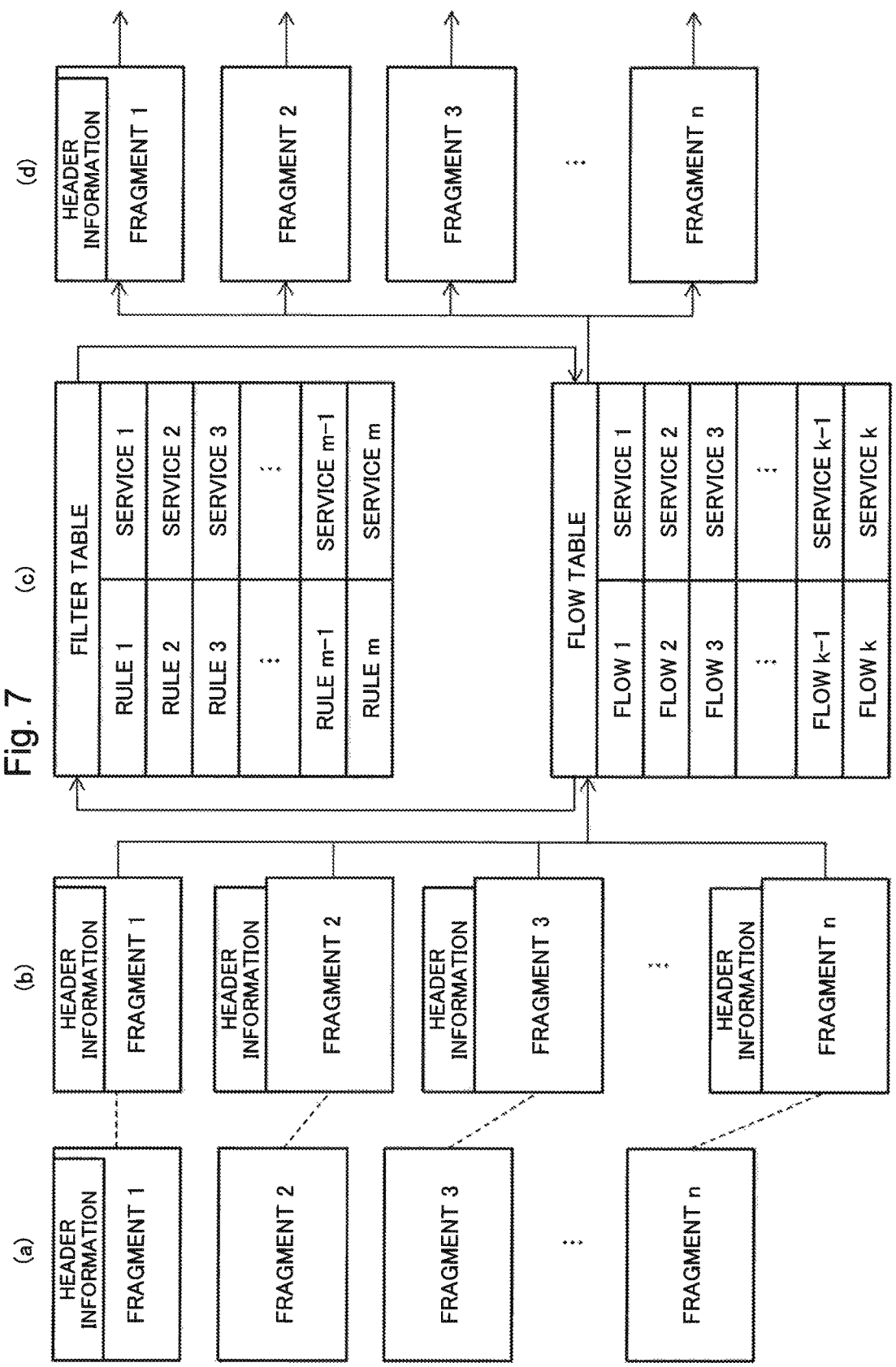
FIG. 7 shows a diagram illustrating an example of a flow of packet data in the second example embodiment of the present invention.
Figure 9:
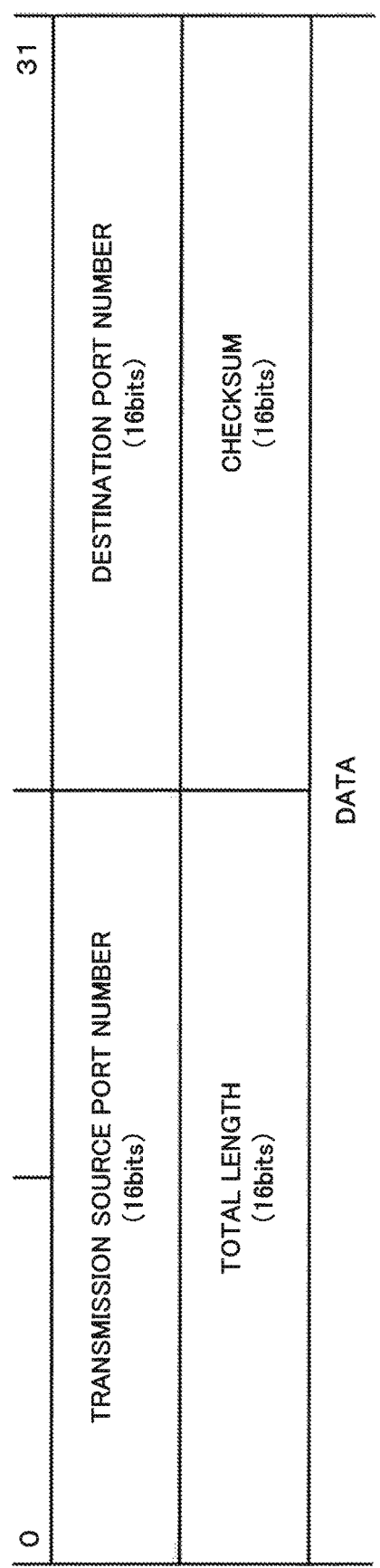
FIG. 9 shows a diagram illustrating a UDP header.

Next, there is described an example of a flow of packet data in the filtering apparatus of the example embodiment using FIG. 7.

An operation of FIG. 7(*a*) and FIG. 7(*b*) is the same as in the first example embodiment, because the operation is an operation by the pseudo header attaching unit.

The filtering apparatus searches whether or not a flow associated with each header information (e.g. an IP 5-tuple) exists in the flow table (FIG. 7(*c*)) before filtering is performed with respect to each packet data (FIG. 7(*b*)) having a pseudo header attached thereto. When there exists a flow associated with header information as a result of search, the filtering apparatus determines a process (a service) associated with the flow as a process to be performed with respect to packet data. When there does not exist a flow associated with header information, the filtering apparatus performs filtering, and registers a filtering result in the flow table.

Further, as well as FIG. 4(d), in FIG. 7(d), the filtering apparatus deletes a pseudo header attached in FIG. 7(b), and performs a process according to a determined process content.

As described above, in the second example embodiment of the present invention, as well as the first example embodiment, it is possible to attach a pseudo header to a fragment packet. Therefore, also in the second example embodiment, it is possible to perform filtering of packet data without distinguishing a non-fragment packet and a fragment packet.

Further, a flow table is searched before a filter table is searched, which takes time in search. This makes it possible to more speedily determine a process to be performed with respect to packet data having header information, which is searched in a filter table before.

Third Example Embodiment

Next, the third example embodiment of the present invention is described.

A configuration example of a filtering apparatus in the example embodiment is the same as illustrated in FIG. 1. A filtering apparatus 10 is constituted by a receiving unit 11, a pseudo header attaching unit 12, a filtering unit 13, a processing unit 14, and a filter table 15.

The receiving unit 11 is a unit configured to receive packet data.

The pseudo header attaching unit 12 is a unit configured to attach a pseudo header to packet data when received packet data is a fragment packet, and is not a leading fragment packet. In this case, the pseudo header attaching unit 12 attaches header information of a leading fragment packet having the same fragment packet identification information as the packet data as a pseudo header.

The filter table 15 is a table, in which a filter criterion relating to header information, and a process to be performed when the filter criterion is satisfied are associated with each other.

The filtering unit 13 is a unit configured to search the filter table 15 by using header information of packet data as a key, and configured to determine a process associated with a filter criterion to be satisfied by the header information of the packet data as a process to be performed with respect to the packet data.

The processing unit 14 is a unit configured to delete a pseudo header attached by the pseudo header attaching unit 12 from packet data, and configured to perform a process determined by the filtering unit 13 with respect to the packet data.

Configuring the filtering apparatus of the example embodiment as described above makes it possible to perform filtering of packet data without distinguishing a non-fragment packet and a fragment packet.

Figure 11:
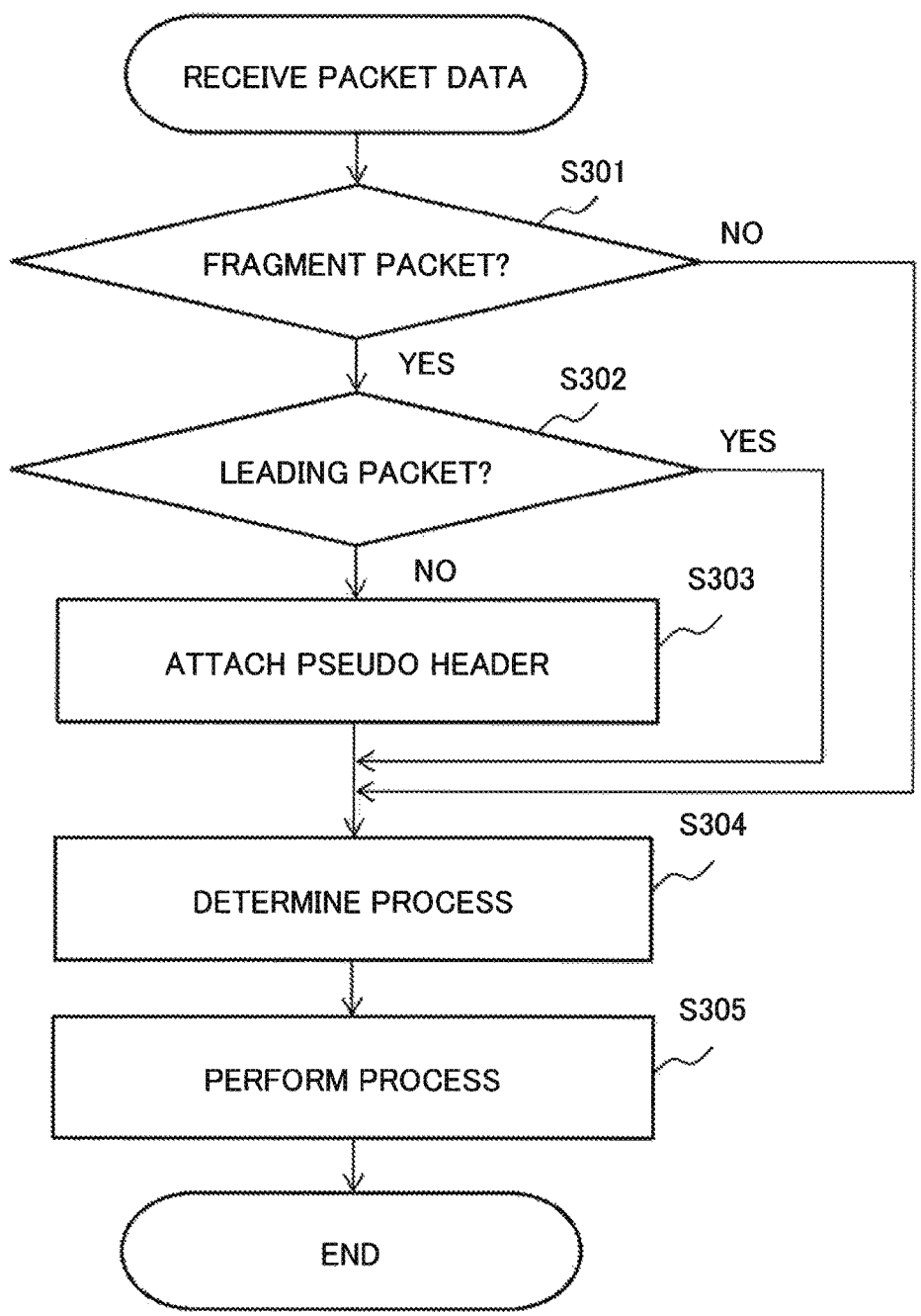
FIG. 11 shows a diagram illustrating an operation example of a filtering apparatus in a third example embodiment of the present invention.

Next, an operation example of the filtering apparatus in the example embodiment is described using FIG. 11.

First of all, the pseudo header attaching unit 12 in the filtering apparatus 10 confirms whether or not received packet data is a fragment packet (Step S301), and whether or not the received packet data is a leading fragment packet (Step S302). Further, when received packet data is a fragment packet, and is not a leading fragment packet, the pseudo header attaching unit 12 attaches a pseudo header to the packet data (Step S303). In this case, the pseudo header attaching unit 12 attaches header information of a leading fragment packet having the same fragment packet identification information as the packet data, as a pseudo header.

Next, the filtering unit 13 searches the filter table 15 by using header information of packet data as a key, and determines a process associated with a filter criterion to be satisfied by the header information of the packet data as a process to be performed with respect to the packet data (Step S304).

Further, the processing unit 14 deletes a pseudo header attached by the pseudo header attaching unit 12 from packet data, and performs a process determined by the filtering unit 13 with respect to the packet data (Step S305).

Operating the filtering apparatus of the example embodiment as described above makes it possible to perform filtering of packet data without distinguishing a non-fragment packet and a fragment packet.

As described above, in the third example embodiment of the present invention, as well as the first and second example embodiments, it is possible to attach a pseudo header to a fragment packet. Therefore, also in the second example embodiment, it is possible to perform filtering of packet data without distinguishing a non-fragment packet and a fragment packet.

Further, the foregoing description is made based on the premise that packet data is an IP packet. The filtering apparatus, the filtering method, and the recording medium of the present invention, however, are also applicable to another packet format other than an IP packet.

Hardware Configuration Example

There is described a configuration example of a hardware resource which implements the filtering apparatus (10, 20) in the example embodiments of the present invention described above with use of one information processing device (a computer). Note that the filtering apparatus (10, 20) may be physically or functionally implemented by using at least two information processing devices. Further, the filtering apparatus (10, 20) may be implemented as a dedicated device. Further, only a part of functions of the filtering apparatus (10, 20) may be implemented by using an information processing device.

Figure 12:
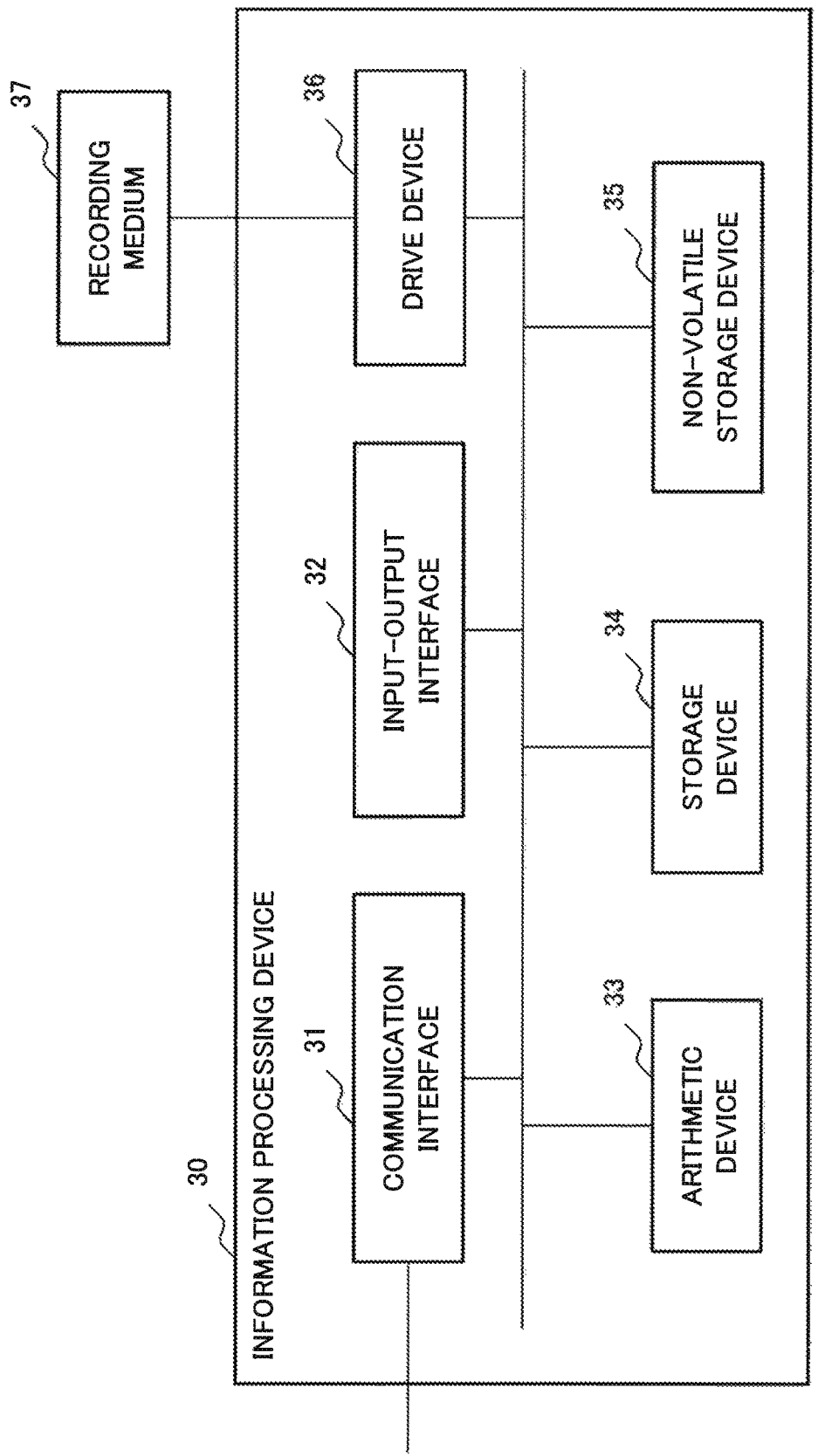
FIG. 12 shows a diagram illustrating an example of a hardware configuration of the example embodiments of the present invention.

FIG. 12 is a diagram schematically illustrating a hardware configuration example of an information processing device capable of implementing the filtering apparatus of the example embodiments of the present invention. An information processing device 30 includes a communication interface 31, an input-output interface 32, an arithmetic device 33, a storage device 34, a non-volatile storage device 35, and a drive device 36.

The communication interface 31 is communication means by which the filtering apparatus (10, 20) of the example embodiments communicates with an external device wiredly or/and wirelessly. Note that when the filtering apparatus (10, 20) is implemented by using at least two information processing devices, the devices may be communicably connected to each other via the communication interface 31.

The input-output interface 32 is a man-machine interface such as a keyboard as an example of an input device, or a display as an output device.

The arithmetic device 33 is an arithmetic processing device such as a general-purpose CPU (Central Processing Unit) or a microprocessor. The arithmetic device 33 is, for instance, operable to read various programs stored in the non-volatile storage device 35 into the storage device 34, and to perform a process according to a read program.

The storage device 34 is a memory device such as an RAM (Random Access Memory) referable from the arithmetic device 33, and stores a program, various data, and the like. The storage device 34 may also be a volatile memory device.

The non-volatile storage device 35 is, for instance, a non-volatile storage device such as an ROM (Read Only Memory) or a flash memory, and is operable to record various programs, data, and the like.

The drive device 36 is, for instance, a device configured to perform a data reading or writing process with respect to a recording medium 37 to be described later.

The recording medium 37 is an arbitrary data recordable recording medium such as an optical disc, a magneto-optical disk, or a semiconductor flash memory.

The example embodiments of the present invention may be implemented by configuring the filtering apparatus (10, 20) by the information processing device 30 exemplified in FIG. 12, and by supplying a program capable of implementing the functions described in the example embodiments to the filtering apparatus, for instance. In this case, it is possible to implement the example embodiments by causing the arithmetic device 33 to perform a program supplied to the filtering apparatus. Further, not all of the functions of the filtering apparatus, but a part of the functions of the filtering apparatus may be constituted by the information processing device 30.

Further, the program may be recorded in the recording medium 37, and the program may be stored in the non-volatile storage device 35 as necessary via the drive device 36 at a stage of shipment of the filtering apparatus, at an operational stage, or the like. Note that in this case, a method for supplying the program may be a method, in which the program is installed in the filtering apparatus with use of an appropriate jig at a manufacturing stage before shipment, at an operational stage, or the like. Further, a method for supplying the program may be a general method such as a method in which the program is downloaded from the outside via a communication line such as the Internet.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2014-257131, filed on Dec. 19, 2014, the disclosure of which is incorporated herein in its entirety by reference.

The whole or part of the example embodiments disclosed above can be described as, but not limited to, the following supplementary notes.

(Supplementary Note 1)

A filtering apparatus comprising:

a receiving means for receiving packet data;

a pseudo header attaching means for attaching header information of a leading fragment packet having same fragment packet identification information as the packet data to the packet data as a pseudo header when the received packet data is a fragment packet, and is not a leading fragment packet;

a filtering means for searching a filter table, in which a filter criterion relating to the header information, and a process to be performed when the filter criterion is satisfied are associated with each other by using the header information of the packet data as a key, and determining the process associated with the filter criterion to be satisfied by the header information of the packet data, as a process to be performed with respect to the packet data; and a processing means for deleting the pseudo header attached by the pseudo header attaching means from the packet data, and performing the process determined by the filtering means with respect to the packet data.

(Supplementary Note 2)

The filtering apparatus according to Supplementary Note 1, wherein the filtering means further stores the header information, and the process associated with the filter criterion in a flow table when the header information of the packet data satisfies the filter criterion, searches the flow table by using the header information of the packet data as a key before the filter table is searched, determines the process associated with the header information as a process to be performed with respect to the packet data when the header information of the packet data exists in the flow table, and searches the filter table when the header information of the packet data does not exist in the flow table.

(Supplementary Note 3)

The filtering apparatus according to Supplementary Note 1 or Supplementary Note 2, wherein the pseudo header attaching means stores the header information of the packet data as the pseudo header to be attached to another fragment packet having same fragment packet identification information when the packet data is a fragment packet, and is a leading fragment packet.

(Supplementary Note 4)

The filtering apparatus according to Supplementary Note 1 or Supplementary Note 2, wherein the pseudo header attaching means stores the header information of the packet data, and attaches the stored header information to another fragment packet having same fragment packet identification information as the pseudo header when the packet data is a fragment packet, and is a leading fragment packet.

(Supplementary Note 5)

The filtering apparatus according to Supplementary Note 3 or Supplementary Note 4, wherein the pseudo header attaching means stores the packet data until the header information is stored when the packet data is a fragment packet, and is not a leading fragment packet, and when the header information relating to fragment packet identification information of the packet data is not stored, and attaches the header information to the stored packet data as the pseudo header when the header information is stored.

(Supplementary Note 6)

The filtering apparatus according to Supplementary Note 5, wherein when a predetermined time period elapses after it is confirmed that the header information of the packet data is a final fragment packet, or when a predetermined time period elapses after the packet data having the certain fragment packet identification information is received most recently, the pseudo header attaching means allows to use a storage area for the header information relating to the fragment packet identification information of the packet data, and for the packet data as a storage area relating to another fragment packet identification information.

(Supplementary Note 7)

A filtering method comprising:

receiving packet data;

attaching header information of a leading fragment packet having same fragment packet identification information as the packet data to the packet data as a pseudo header when the packet data is a fragment packet, and is not a leading fragment packet;

searching a filter table in which a filter criterion relating to the header information, and a process to be performed when the filer criterion is satisfied are associated with each other by using the header information of the packet data as a key, and determining the process associated with the filter criterion to be satisfied by the header information of the packet data as a process to be performed with respect to the packet data; and deleting the attached pseudo header from the packet data, and performing the determined process with respect to the packet data.

(Supplementary Note 8)

The filtering method according to Supplementary Note 7, wherein the filtering method further comprises storing the header information, and the process associated with the filter criterion in a flow table when the header information of the packet data satisfies the filter criterion;

searching the flow table by using the header information of the packet data as a key before the filter table is searched;

determining the process associated with the header information as a process to be performed with respect to the packet data when the header information of the packet data exists in the flow table; and searching the filter table when the header information of the packet data does not exist in the flow table.

(Supplementary Note 9)

The filtering method according to Supplementary Note 7 or Supplementary Note 8, wherein the filtering method comprises storing the header information of the packet data as the pseudo header to be attached to another fragment packet having same fragment packet identification information when the packet data is a fragment packet, and is a leading fragment packet.

(Supplementary Note 10)

The filtering method according to Supplementary Note 7 or Supplementary Note 8, wherein the filtering method comprises storing the header information of the packet data, and attaching the stored header information to another fragment packet having same fragment packet identification information as the pseudo header when the packet data is a fragment packet, and is a leading fragment packet.

(Supplementary Note 11)

The filtering method according to Supplementary Note 9 or Supplementary Note 10, wherein the filtering method comprises storing the packet data until the header information is stored when the packet data is a fragment packet, and is not a leading fragment packet, and when the header information relating to fragment packet identification information of the packet data is not stored, and attaching the header information to the stored packet data as the pseudo header when the header information is stored.

(Supplementary Note 12)

The filtering method according to Supplementary Note 11, wherein the filtering method comprises allowing to use a storage area for the header information relating to the fragment packet identification information of the packet data, and for the packet data as a storage area relating to another fragment packet identification information, when a predetermined time period elapses after it is confirmed that the header information of the packet data is a final fragment packet, or when a predetermined time period elapses after the packet data having the certain fragment packet identification information is received most recently.

(Supplementary Note 13)

A computer readable recording medium recorded with a filtering program which causes a computer to implement:

a receiving function of receiving packet data;

a pseudo header attaching function of attaching header information of a leading fragment packet having same fragment packet identification information as the packet data to the packet data as a pseudo header when the packet data is a fragment packet, and is not a leading fragment packet;

a filtering function of searching a filter table in which a filter criterion relating to the header information, and a process to be performed when the filer criterion is satisfied are associated with each other by using the header information of the packet data as a key, and determining the process associated with the filter criterion to be satisfied by the header information of the packet data as a process to be performed with respect to the packet data; and a processing function of deleting the pseudo header attached by the pseudo header attaching function from the packet data, and performing the process determined by the filtering function with respect to the packet data.

(Supplementary Note 14)

The computer readable recording medium recorded with the filtering program according to Supplementary Note 13, wherein the filtering function further stores the header information, and the process associated with the filter criterion in a flow table when the header information of the packet data satisfies the filter criterion, searches the flow table by using the header information of the packet data as a key before the filter table is searched, determines the process associated with the header information as a process to be performed with respect to the packet data when the header information of the packet data exists in the flow table, and searches the filter table when the header information of the packet data does not exist in the flow table.

(Supplementary Note 15)

The computer readable recording medium recorded with the filtering program according to Supplementary Note 13 or Supplementary Note 14, wherein the pseudo header attaching function stores the header information of the packet data as the pseudo header to be attached to another fragment packet having same fragment packet identification information when the packet data is a fragment packet, and is a leading fragment packet.

(Supplementary Note 16)

The computer readable recording medium recorded with the filtering program according to Supplementary Note 13 or Supplementary Note 14, wherein the pseudo header attaching function stores the header information of the packet data, and the stored header information is attached to another fragment packet having same fragment packet identification information as the pseudo header when the packet data is a fragment packet, and is a leading fragment packet.

(Supplementary Note 17)

The computer readable recording medium recorded with the filtering program according to Supplementary Note 15 or Supplementary Note 16, wherein the pseudo header attaching function stores the packet data until the header information is stored when the packet data is a fragment packet, and is not a leading fragment packet, and when the header information relating to fragment packet identification information of the packet data is not stored, and attaches the header information to the stored packet data as the pseudo header when the header information is stored.

(Supplementary Note 18)

The computer readable recording medium recorded with the filtering program according to Supplementary Note 17, wherein when a predetermined time period elapses after it is confirmed that the header information of the packet data is a final fragment packet, or when a predetermined time period elapses after the packet data having the certain fragment packet identification information is received most recently, the pseudo header attaching function allows to use a storage area for the header information relating to the fragment packet identification information of the packet data, and for the packet data as a storage area relating to another fragment packet identification information.

REFERENCE SIGNS LIST 10, 20 Filtering apparatus
11 Receiving unit
12 Pseudo header attaching unit
13, 23 Filtering unit
14 Processing unit
15 Filter table
26 Flow search unit
27 Flow table
30 Information processing device

The invention claimed is:

1. A filtering apparatus comprising:
an information processing device having an input that receives packet data;
the information processing device configured to implement a pseudo header attaching function of attaching header information of a leading fragment packet having same fragment packet identification information as the packet data to the packet data as a pseudo header when the received packet data is a fragment packet, and the received packet data is not a leading fragment packet;
the information processing device including a filter having a first input connected to receive package data input including the header information and a second input connected to a filter table, the filter configured to search the filter table, in which a filter criterion relating to the header information and a process to be performed when the filter criterion is satisfied are associated with each other by using the header information of the packet data as a key, and configured to determine the process associated with the filter criterion to be satisfied by the header information of the packet data, as a process to be performed with respect to the packet data; and
the information processing device including a processor having a first input connected to the output of the filter to receive the packet data from the filter, the processor configured to delete the attached pseudo header from the packet data received in the packet data from the filter, and configured to perform the determined process with respect to the packet data.

2. The filtering apparatus according to claim 1, wherein the filter further stores the header information, and the process associated with the filter criterion in a flow table when the header information of the packet data satisfies the filter criterion, searches the flow table by using the header information of the packet data as a key before the filter table is searched, determines the process associated with the header information as a process to be performed with respect to the packet data when the header information of the packet data exists in the flow table, and searches the filter table when the header information of the packet data does not exist in the flow table.

3. The filtering apparatus according to claim 1, wherein the pseudo header attaching function stores the header information of the packet data as the pseudo header to be attached to another fragment packet having same fragment packet identification information when the packet data is a fragment packet, and is a leading fragment packet.

4. The filtering apparatus according to claim 1, wherein the pseudo header attaching function stores the header information of the packet data, and attaches the stored header information to another fragment packet having same fragment packet identification information as the pseudo header when the packet data is a fragment packet, and is a leading fragment packet.

5. The filtering apparatus according to claim 3, wherein the pseudo header attaching function stores the packet data until the header information is stored when the packet data is a fragment packet, and is not a leading fragment packet, and when the header information relating to fragment packet identification information of the packet data is not stored, and attaches the header information to the stored packet data as the pseudo header when the header information is stored.

6. The filtering apparatus according to claim 5, wherein when a predetermined time period elapses after it is confirmed that the header information of the packet data is a final fragment packet, or when a predetermined time period elapses after the packet data having the certain fragment packet identification information is received most recently, the pseudo header attaching function allows to use a storage area for the header information relating to the fragment packet identification information of the packet data, and for the packet data as a storage area relating to another fragment packet identification information.

7. A filtering method comprising:
receiving packet data;
attaching header information of a leading fragment packet having same fragment packet identification information as the packet data to the packet data as a pseudo header when the packet data is a fragment packet, and is not a leading fragment packet;
searching a filter table in which a filter criterion relating to the header information, and a process to be performed when the filter criterion is satisfied are associated with each other by using the header information of the packet data as a key, and determining the process associated with the filter criterion to be satisfied by the header information of the packet data as a process to be performed with respect to the packet data; and
deleting the attached pseudo header from the packet data, and performing the determined process with respect to the packet data.

8. The filtering method according to claim 7, wherein the filtering method further comprises
storing the header information, and the process associated with the filter criterion in a flow table when the header information of the packet data satisfies the filter criterion;

searching the flow table by using the header information of the packet data as a key before the filter table is searched;

determining the process associated with the header information as a process to be performed with respect to the packet data when the header information of the packet data exists in the flow table; and searching the filter table when the header information of the packet data does not exist in the flow table.

9. A non-transitory computer readable recording medium recorded with a filtering program which causes a computer to implement:

a receiving function of receiving packet data;

a pseudo header attaching function of attaching header information of a leading fragment packet having same fragment packet identification information as the packet data to the packet data as a pseudo header when the packet data is a fragment packet, and is not a leading fragment packet;

a filtering function of searching a filter table in which a filter criterion relating to the header information, and a process to be performed when the filter criterion is satisfied are associated with each other by using the header information of the packet data as a key, and determining the process associated with the filter criterion to be satisfied by the header information of the packet data as a process to be performed with respect to the packet data; and a processing function of deleting the pseudo header attached by the pseudo header attaching function from the packet data, and performing the process determined by the filtering function with respect to the packet data.

10. The non-transitory computer readable recording medium recorded with the filtering program according to claim 9, wherein the filtering function further stores the header information, and the process associated with the filter criterion in a flow table when the header information of the packet data satisfies the filter criterion, searches the flow table by using the header information of the packet data as a key before the filter table is searched, determines the process associated with the header information as a process to be performed with respect to the packet data when the header information of the packet data exists in the flow table, and searches the filter table when the header information of the packet data does not exist in the flow table.

11. The filtering method according to claim 7, wherein the filtering method comprises storing the header information of the packet data as the pseudo header to be attached to another fragment packet having same fragment packet identification information when the packet data is a fragment packet, and is a leading fragment packet.

12. The filtering method according to claim 7, wherein the filtering method comprises storing the header information of the packet data, and attaching the stored header information to another fragment packet having same fragment packet identification information as the pseudo header when the packet data is a fragment packet, and is a leading fragment packet.

13. The filtering method according to claim 11, wherein the filtering method comprises storing the packet data until the header information is stored when the packet data is a fragment packet, and is not a leading fragment packet, and when the header information relating to fragment packet identification information of the packet data is not stored, and attaching the header information to the stored packet data as the pseudo header when the header information is stored.

14. The filtering method according to claim 13, wherein the filtering method comprises allowing to use a storage area for the header information relating to the fragment packet identification information of the packet data, and for the packet data as a storage area relating to another fragment packet identification information, when a predetermined time period elapses after it is confirmed that the header information of the packet data is a final fragment packet, or when a predetermined time period elapses after the packet data having the certain fragment packet identification information is received most recently.

15. The non-transitory computer readable recording medium recorded with the filtering program according to claim 9, wherein the pseudo header attaching function stores the header information of the packet data as the pseudo header to be attached to another fragment packet having same fragment packet identification information when the packet data is a fragment packet, and is a leading fragment packet.

16. The non-transitory computer readable recording medium recorded with the filtering program according to claim 9, wherein the pseudo header attaching function stores the header information of the packet data, and the stored header information is attached to another fragment packet having same fragment packet identification information as the pseudo header when the packet data is a fragment packet, and is a leading fragment packet.

17. The non-transitory computer readable recording medium recorded with the filtering program according to claim 15, wherein the pseudo header attaching function stores the packet data until the header information is stored when the packet data is a fragment packet, and is not a leading fragment packet, and when the header information relating to fragment packet identification information of the packet data is not stored, and attaches the header information to the stored packet data as the pseudo header when the header information is stored.

18. The non-transitory computer readable recording medium recorded with the filtering program according to claim 17, wherein when a predetermined time period elapses after it is confirmed that the header information of the packet data is a final fragment packet, or when a predetermined time period elapses after the packet data having the certain fragment packet identification information is received most recently, the pseudo header attaching function allows to use a storage area for the header information relating to the fragment packet identification information of the packet data, and for the packet data as a storage area relating to another fragment packet identification information.

19. The filtering apparatus according to claim 1, wherein the filter is configured to search the filter table and determine the process associated with the filter criterion without distinguishing non-fragment packets from fragment packets.

20. The method of claim 7, wherein, in step of said searching the filter table and determining the process associated with the filter criterion are done without distinguishing non-fragment packets from fragment packets.

* * * * *